(12) United States Patent
Bolcato

(10) Patent No.: US 6,169,250 B1
(45) Date of Patent: Jan. 2, 2001

(54) LOW VOLTAGE RE-ENTERABLE SPLICE ENCLOSURE

(75) Inventor: Giuliano Bolcato, Paderno Dugnano (IT)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/301,707

(22) Filed: Apr. 29, 1999

(51) Int. Cl.$^7$ .................................................. H02G 15/113
(52) U.S. Cl. ............................................................ 174/92
(58) Field of Search ..................... 174/92, 138 F

(56) References Cited

U.S. PATENT DOCUMENTS

| | | | |
|---|---|---|---|
| 3,183,302 | * | 5/1965 | Wochner et al. ................... 174/92 X |
| 4,449,015 | * | 5/1984 | Hotchkiss et al. ................ 174/138 F |
| 4,451,696 | * | 5/1984 | Beinhaur ................................. 174/92 |
| 4,610,738 | | 9/1986 | Jervis ..................................... 156/49 |
| 4,643,505 | * | 2/1987 | House et al. ....................... 174/92 X |
| 4,692,564 | * | 9/1987 | Campbell et al. ..................... 174/92 |
| 5,397,859 | | 3/1995 | Robertson et al. .................... 174/92 |
| 5,828,005 | | 10/1998 | Huynh-Ba et al. .................... 174/92 |

FOREIGN PATENT DOCUMENTS

| | | | |
|---|---|---|---|
| 0 072 632 A1 | 7/1982 | (EP) | ............................. H02G/15/076 |
| 0 328 386 B1 | 2/1989 | (EP) | ............................... H01R/13/52 |
| WO 97/16869 | 5/1997 | (WO) | ................................ H01R/4/70 |
| WO 97/42694 | 11/1997 | (WO) | ............................... H02G/15/18 |

* cited by examiner

*Primary Examiner*—Kristine Kincaid
*Assistant Examiner*—Chau N. Nguyen
(74) *Attorney, Agent, or Firm*—Matthew B. McNutt

(57) ABSTRACT

An re-enterable enclosure for protecting a cable splice includes a first cover member, a second cover member, and a splice fixation member. The first and second cover members are configured to releasably engage each other and form a cavity for enclosing the cable splice. The cavity is filled with a sealant material for electrically insulating the cable splice and protecting the cable splice from the environment. The cable splice is attached to the fixation member and the cover members are closed around the fixation member and attached splice.

16 Claims, 13 Drawing Sheets

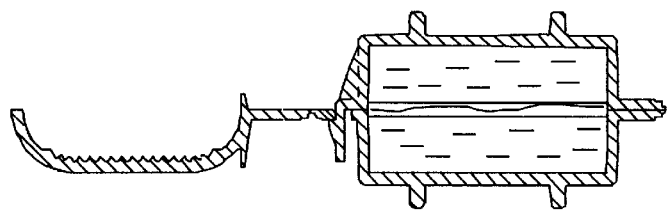
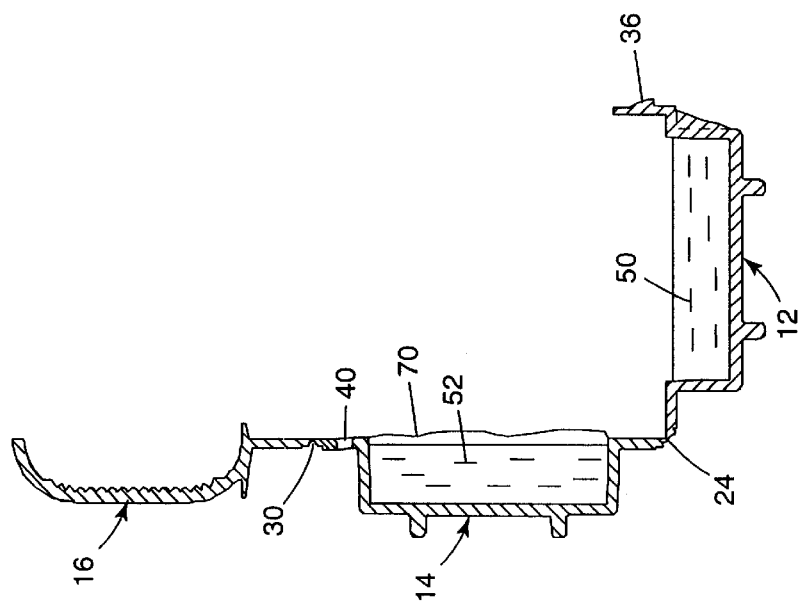
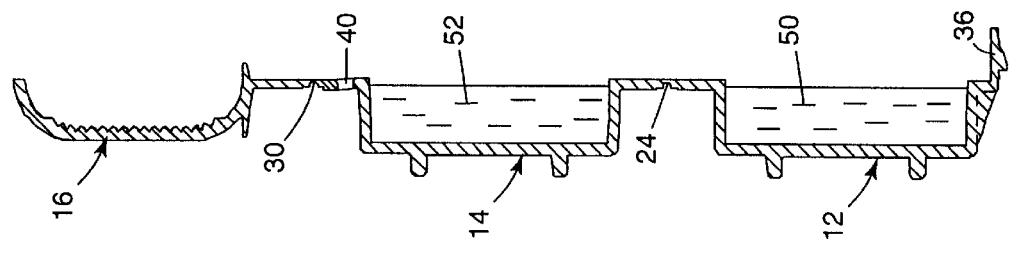

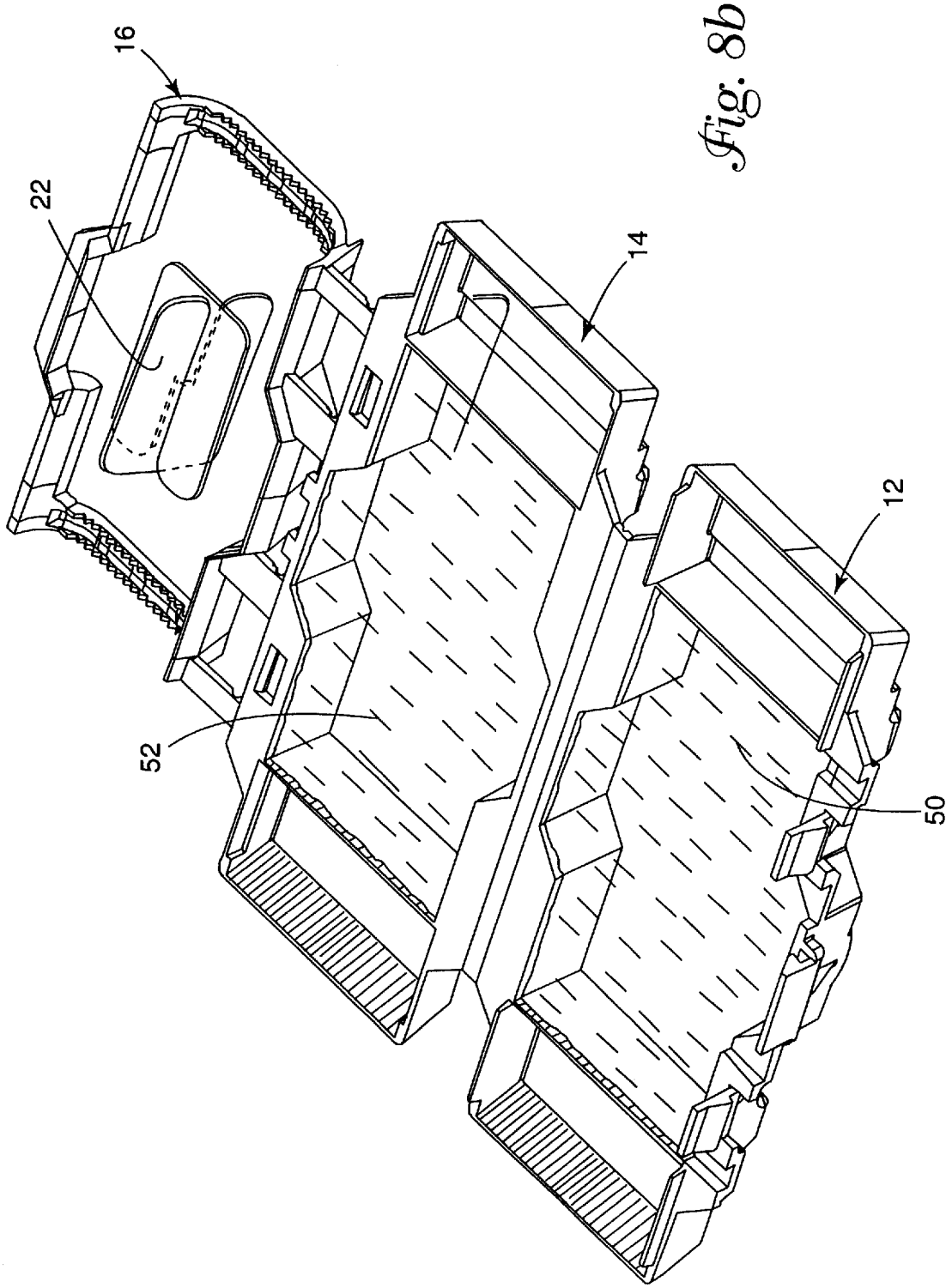

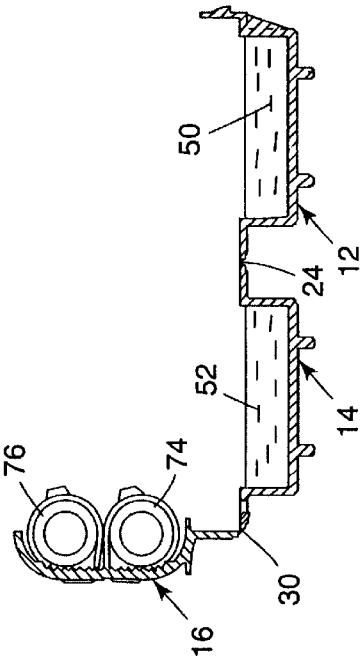
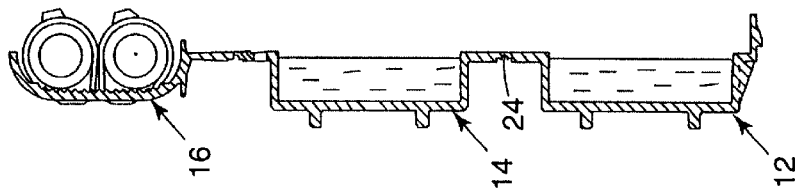
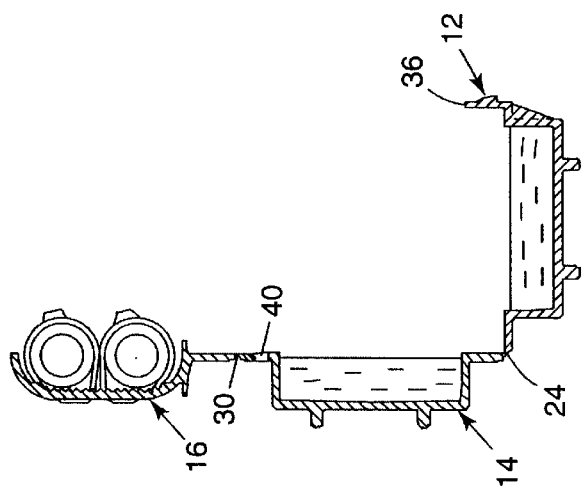
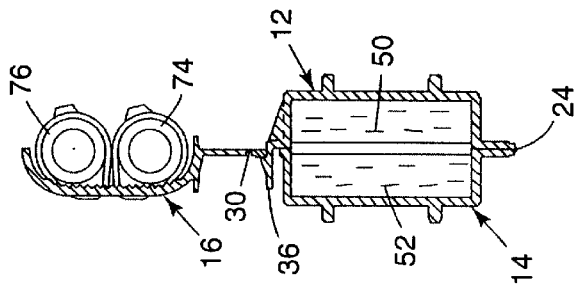

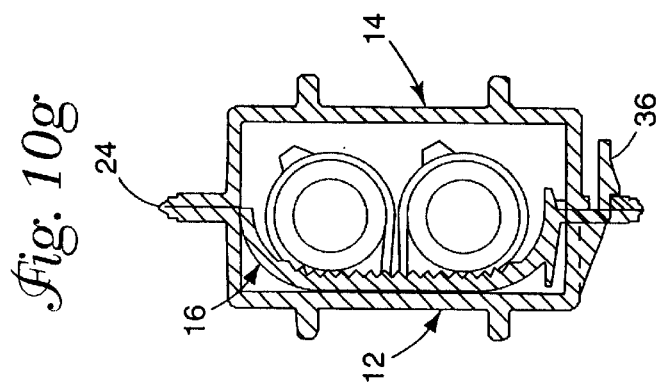
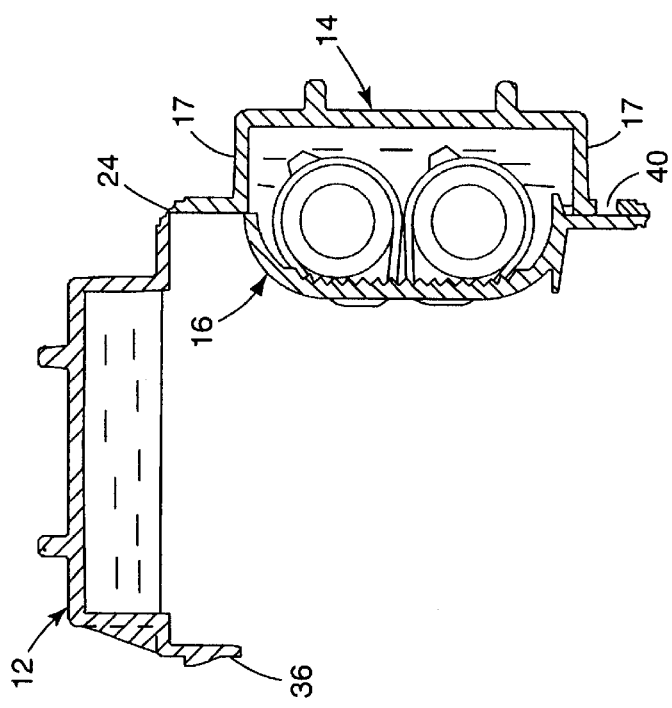
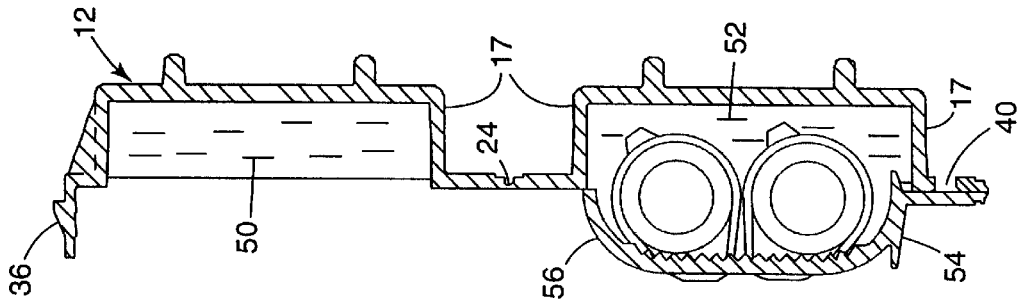

LOW VOLTAGE RE-ENTERABLE SPLICE ENCLOSURE

FIELD OF THE INVENTION

The present invention relates to enclosures for cable splices. More specifically, the invention relates to an enclosure for a longitudinally extended cable splice, where the splice includes at least one connector for connecting at least two cables. At least a portion of the enclosure is filled with a sealant to provide electrical insulation and environmental protection to the cable splice.

BACKGROUND OF THE INVENTION

Longitudinally extended cable splices for low voltage power applications are well known. Such cable splices may be of the butt or inline type, and typically require protection against mechanical impact, electrical shock and the ingress of water or humidity. Typically, between two and four cables are spliced together using a connector, such as a screw connector, a crimp connector or any other suitable connector known in the art. The cross section of the cables are typically in the range of 1.5 to 150 mm$^2$, corresponding to diameters in the range of 5 to 30 mm. Accordingly, the dimensions of the enclosures are on the order of several centimeters, at least.

The most effective and safest way to achieve a splice enclosure which provides the necessary protection against mechanical impact, electrical shock and ingress of water or humidity is to arrange the cable splice into an splice enclosure or mold into which a hardenable resin is injected. The hardened resin itself then forms the splice body. Unfortunately, this type of splice body does not allow a nondestructive reopening of the splice if required. However, it is often necessary to reopen a splice body for a variety of reasons.

Thus, in a large variety of applications it is desirable to have a splice body that allows reentry without destroying the splice body or using undue force. Further, it would be extremely desirable to maintain the possibility of re-closing the protective splice body after the completion of the work on the spliced cables.

Several splice enclosures and methods of using such enclosures have been developed which allow reentry into the protective enclosure without destroying the enclosure and/or the splice. Typically, the cable splice is surrounded by material having a viscosity which is low enough that the material can easily penetrate into all interstices of the cable connection. Typically, the material does not harden completely, so that the splice can be relatively easily reopened. However, the viscosity of the material must also be high enough so that it remains in position over a long period of time and does not easily flow out of the splice enclosure. The relatively low viscosity of the material, however, causes another problem. Namely, the cable connection is insufficiently mechanically fixed within the splice body, allowing the spliced cables to move within the splice enclosure in an undesired manner. It thus becomes necessary to provide means for mechanically fixing the cables and the connectors within the splice body, to ensure that uncontrolled movement of the spliced cables does not occur.

European Patent No. EP 0328386 describes a splice enclosure which provides the desired electrical and environmental protection to cable splices. The splice enclosure consists of a molded or extruded part where two portions are connected to each other through a hinge. The two portions of the splice body are filled with a sealant material. This configuration is particularly useful for the connection of relatively small cables with a closed system which provides enough pressure onto the cables to keep them in place.

PCT Publication WO 97/16869 describes a system in which a molded body consists of two parts which are connected to each other through a hinge, both parts being filled with a gel-type material. Both parts of the body are provided with internal protrusions or alignment buttons which prevent the connector of the spliced cable from freely moving within the splice body. This particular system can work satisfactorily only if the size of the cable connector approximately corresponds to the positioning of the internal protrusions which prevent the cable connector from freely moving within the splice body. Larger connectors cannot be placed into the system at all, and smaller connectors would have an unacceptable freedom of movement.

U.S. Pat. No. 5,397,859 describes an enclosure with two parts connected to each other through a hinge, and also provided with a lateral flap. The flap prevents the sealant from moving out of the system in an uncontrolled manner when the enclosure is closed over the splice. The enclosure is designed for use with coaxial cables joined using a special connector. When the spliced cables are pressed between specially designed strain relief means in the enclosure, the splice is provided with the necessary mechanical fixation within the enclosure. The enclosure has limited versatility with respect to the use of different cable types and connectors.

U.S. Pat. No. 4,610,738 shows an enclosure for the splice of bundles of telecommunication cables. As in the previous references, two portions of the enclosure are linked together through a hinge. The two cable bundles are fixed together in the middle of the enclosure using a screw which is provided with a slot into which the cable bundles are inserted, and where the bundles are fixed together using an additional nut. The ends of the bundles are then bent in a perpendicular direction and the cables inserted into the gel of the enclosure while the ends of the bundles are sorted. The individual cables of the bundles are connected to each other with a special holding device capable of allowing the fixation of the individual connectors to each individual cable. Such a system would not be useful to protect common low voltage cable splices as described herein, as the connector of the spliced cables would have to be positioned in the location where the holding screw of the reference is positioned.

The above-mentioned references describe a variety of enclosures for cable splices. However the references are only useful with specific configurations of either the cables or the entire cable splice. For relatively small cable and connector dimensions, the sealant compressed within the enclosure provides the necessary mechanical stabilization. In other configurations, alignment protrusions are arranged within the enclosure to provide mechanical stability. However, the alignment protrusions limit the use of the enclosure to splices having a narrowly defined geometry. The strain relief means which are provided in the enclosure are restricted to cables which fall within a small range of sizes. Finally, the use of fixation screws in the middle of the enclosure preclude the use of the enclosure with typical low voltage splice connectors.

It would therefore be desirable to provide a re-enterable splice enclosure which is usable with cables of widely varying diameters and which provides the necessary electrical and environmental protection, as well as a means for fixing the cables securely within the enclosure.

SUMMARY OF THE INVENTION

The present invention provides an easily re-enterable splice enclosure which securely holds a wide variety of connectors and splice configurations. The inventive enclosure comprises a first cover member and a second cover member, each having two longitudinal sides and two end walls. The cover members are configured to releasably engage each other and form a cavity for enclosing a cable splice. The cavity is filled with a sealant material for electrically insulating the cable splice and protecting the cable splice from the environment. The cables of the cable splice project from at least one of the end walls of the cover members. A cable fixation member is provided for attachment to the cable splice. The fixation member and an attached cable splice are inserted into the cavity formed by the first and second cover members. The fixation member is configured such that a wide variety of cable splices may be attached to the fixation member.

The advantage of having a separate fixation member is that the cable splice can be fixed to the fixation member without interfering in any way with the cover members filled with the sealant (i.e., the cable splice is securely fixed to the fixation member prior to being inserted into the sealant filled cavity). Furthermore, a separate fixation member allows a large variety of cable splices to be used with the enclosure. The only restriction is that the splice must fit within the enclosure cavity formed by the cover members.

For effectively securing the cable splice within the completed enclosure, it is advantageous to have the attachment points on the fixation member positioned such that when the fixation member and attached splice are inserted into the cavity the attachment points are adjacent the end walls of the cavity. This ensures that the cable splice is longitudinally aligned with the enclosure when the fixation member and attached splice are inserted into the cavity.

For a particularly versatile fixation member, it is advantageous to provide the fixation member with multiple attachment points and multiple manners of attaching a splice to the fixation member. For example, the fixation member may be provided with bars which extend laterally across the cavity and which may provide multiple attachment points. Attachment of the splice to the fixation member can be accomplished with strings, wires, threaded fasteners, and more preferably commonly used cable ties. Another preferred attachment method would be the use of clamps which can secure the cable to the fixation member.

BRIEF DESCRIPTION OF THE DRAWINGS

The invention described herein will be best understood from the accompanying drawings which illustrate the preferred embodiments of the invention. The invention, however, is not intended to be limited to the embodiments illustrated, and should be construed as defined by the claims presented below.

FIGS. 5a, 5b and 5c are cross-sectional views of the embodiment of FIGS. 1a and 1b, showing the method for preparing the enclosure for shipment and assembly.

FIG. 8b shows the enclosure and splice of FIG. 8a with the cables removed.

FIGS. 10a–10g are cross-sectional views of the embodiment of the enclosure shown in FIGS. 1a and 1b, showing the progression of steps for inserting the cable splice into the enclosure.

DETAILED DESCRIPTION OF THE INVENTION

Figure 1:
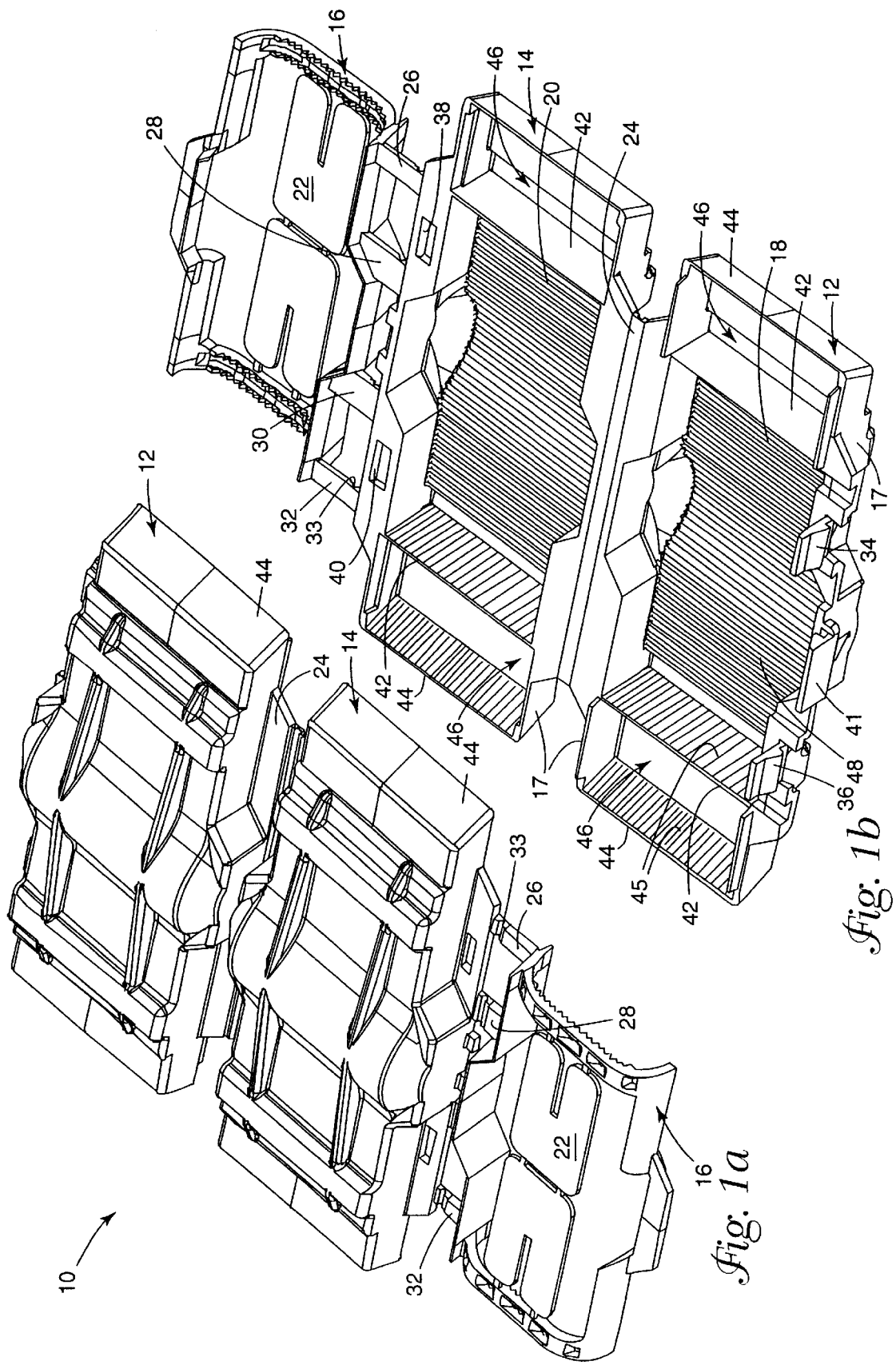
FIGS. 1a and 1b are perspective views of the top and bottom sides of a first embodiment of the inventive enclosure.

FIGS. 1a and 1b illustrate a first embodiment of the inventive enclosure for longitudinally extended cable splices. The enclosure 10 is preferably formed through a molding process and comprises a first cover member 12, a second cover member 14, and a cable fixation member 16. The first cover member 12 and second cover member 14 include cavities 18, 20, respectively, which are designed to hold a sealant material 50, 52, respectively (shown in FIG. 3). Fixation member 16 includes a flat plate 22. The plate 22 is designed to be broken off from fixation member 16 prior to use of the enclosure and can be either discarded or used as a separation means for the spliced cables in a manner described below.

First cover member 12 and second cover member 14 have longitudinal side walls 17. A hinge 24 extends between the side walls 17 of first and second cover members 12, 14, thereby linking cover members 12, 14. The fixation member 16 is hinged to the side wall 17 of second cover member 14 opposite first cover member 12 through hinges 26, 28, 30 and 32. Of course, the number and precise location of the hinges may be altered without affecting the scope of the invention. Hinges 24, 26, 28, 30 and 32 are preferably integrally molded with cover members 12, 14 and fixation member 16, and have an area of reduced thickness 33 which defines the bending axis of the hinge. This type of hinge is often referred to as a "living" hinge. Of course, other well known types of hinges could also be used, including films or tapes. In addition, if the hinges are not integrally molded with the cover members 12, 14 and fixation member 16, separate hinge members could be inset molded into the cover members 12, 14 and fixation member 16, or could be attached after the molding process, such as by an adhesive.

The first cover member 12 is provided with latching tabs 34, 36 which are positioned to engage the openings 38, 40 of second cover member 14 when the first cover member 12 and second cover member 14 are folded together. First cover member 12 also includes a latching tab 41 for engaging the outer edge of second cover member 14. As noted above with respect to hinges 24, 26, 28, and 30, the number and position of the latching tabs may be altered without affecting the scope of the invention.

Cavities 18 and 20 within cover members 12 and 14 extend between intermediate walls 42 which are arranged at a distance from the end walls 44 of the cover members 12 and 14. In this manner, an additional reservoir 46 is created at either end of cover members 12, 14 between intermediate walls 42 and end walls 44 of the cover members 12 and 14. The intermediate walls 42 and end walls 44 are provided with frangible grooves 45. Grooves 45 create a variation in the thickness of walls 42, 44 such that thin and thick wall portions are created. The thickness variation is such that the thin portions allow the walls to fracture when, for example, pressing a cable against them. The thickness variation will depend upon the total thickness of the material, but may, for example, be between 0.15 mm and 1.5 mm in a typical application. It can also be seen in the Figures that the bottom surface of cavities 18 and 20 are provided with ridges 48. Ridges 48 improve the adhesion between the enclosure and the sealant 50, 52 provided in the cavities 18 and 20.

It should be noted that although the embodiments of the invention described herein illustrate both cover members 12, 14 having cavities 18, 20, respectively, it is equally possible that only one of cover members 12, 14 have a cavity, while the other mating cover member functions substantially as a lid. In such an embodiment, sealant material would only be provided in the one cover member having a cavity. Although such an embodiment is not illustrated, it is contemplated to be within the scope of the invention described herein.

Figure 2:
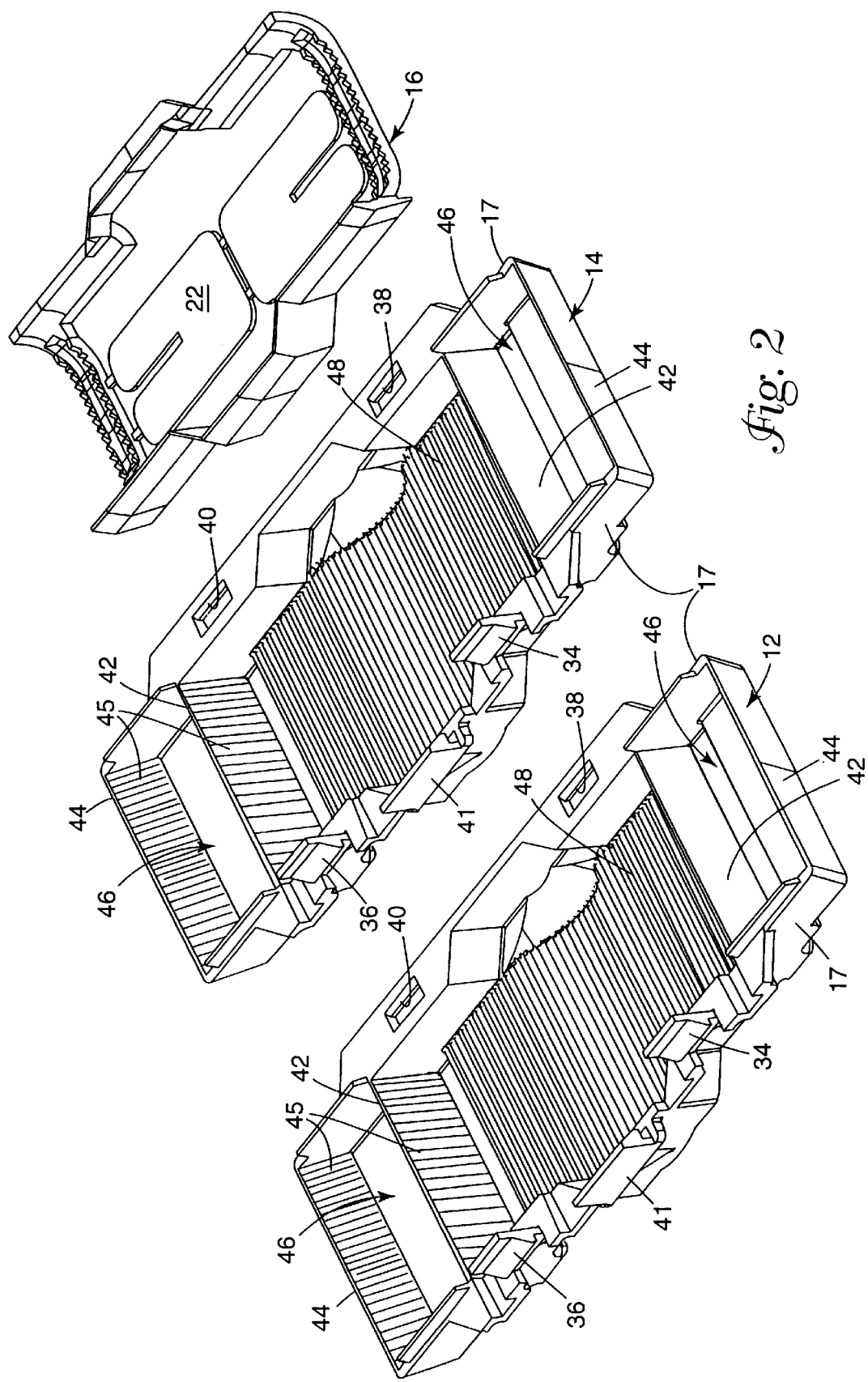
FIG. 2 is a perspective view of a second embodiment of the enclosure.

A second embodiment of the enclosure 10 is shown in FIG. 2. The embodiment of FIG. 2 is substantially similar to the embodiment of FIGS. 1a and 1b described above, and like components are similarly numbered. The primary difference between the second embodiment of FIG. 2 and the embodiments of FIGS. 1a and 1b is that the embodiment of FIG. 2 does not include hinges to link cover members 12 and 14 and fixation member 16. Instead, cover members 12, 14 are provided with latches 34, 36 on both sides of the cover members. As can be seen from FIG. 2, the cover members 12, 14 are identical so that they may be produced from the same mold. In all other respects, the assembly in the use of the enclosure 10 shown in FIG. 2 is like that described for the embodiment of FIGS. 1a and 1b.

Figure 3:
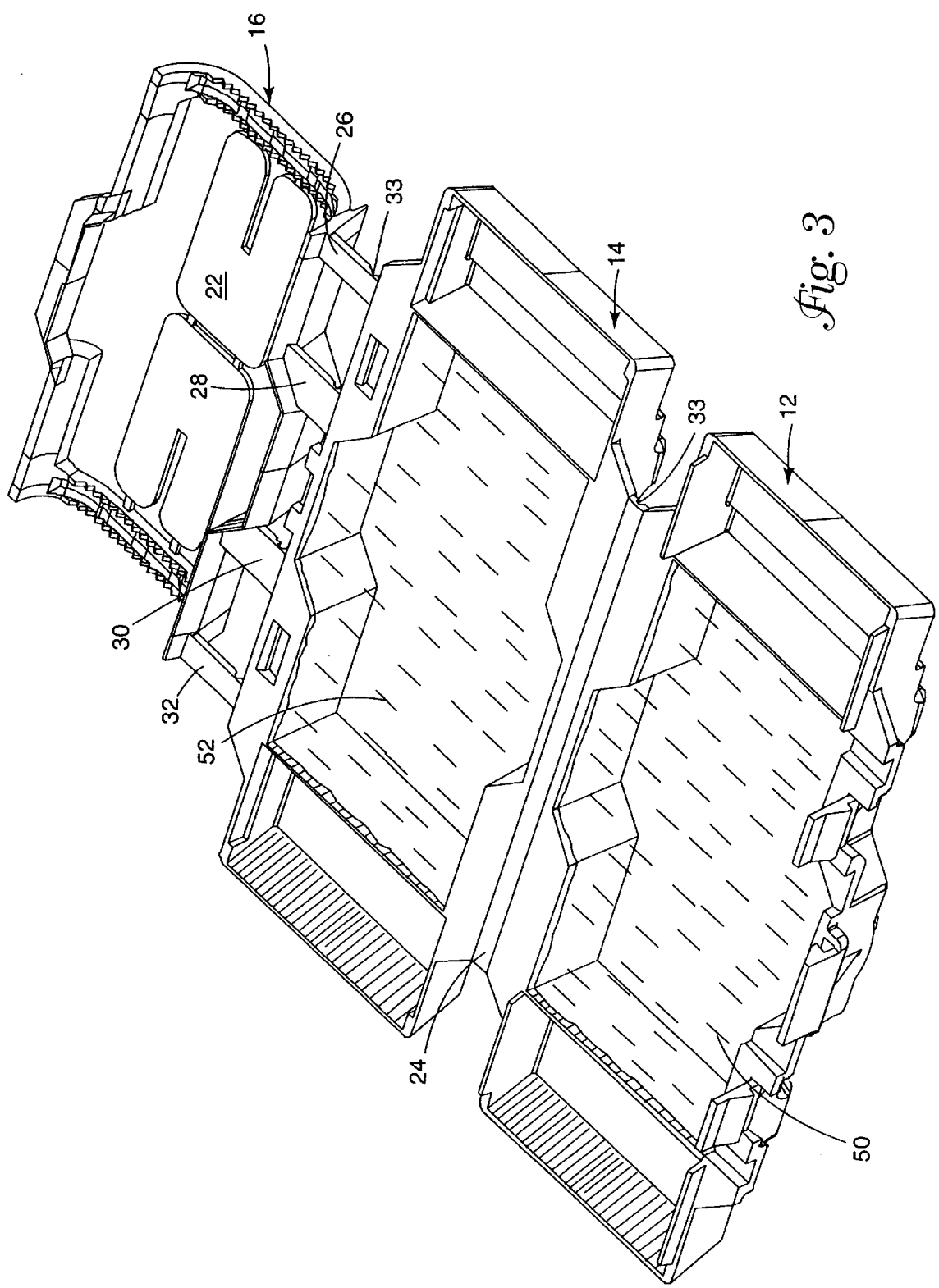
FIG. 3 is a perspective view of the invention as shown in FIG. 1b, showing the cavities of the first and second cover member filled with a sealant.

FIG. 3 is essentially identical to FIG. 1b and shows the enclosure 10 having sealant 50 in cavity 18 and sealant 52 in cavity 20. Sealants 50, 52 will typically have a viscosity which is low enough to allow the sealant to flow into any voids surrounding the spliced cables and the associated connectors, but yet high enough to prevent the sealant from flowing out of the enclosure 10.

Figure 4:
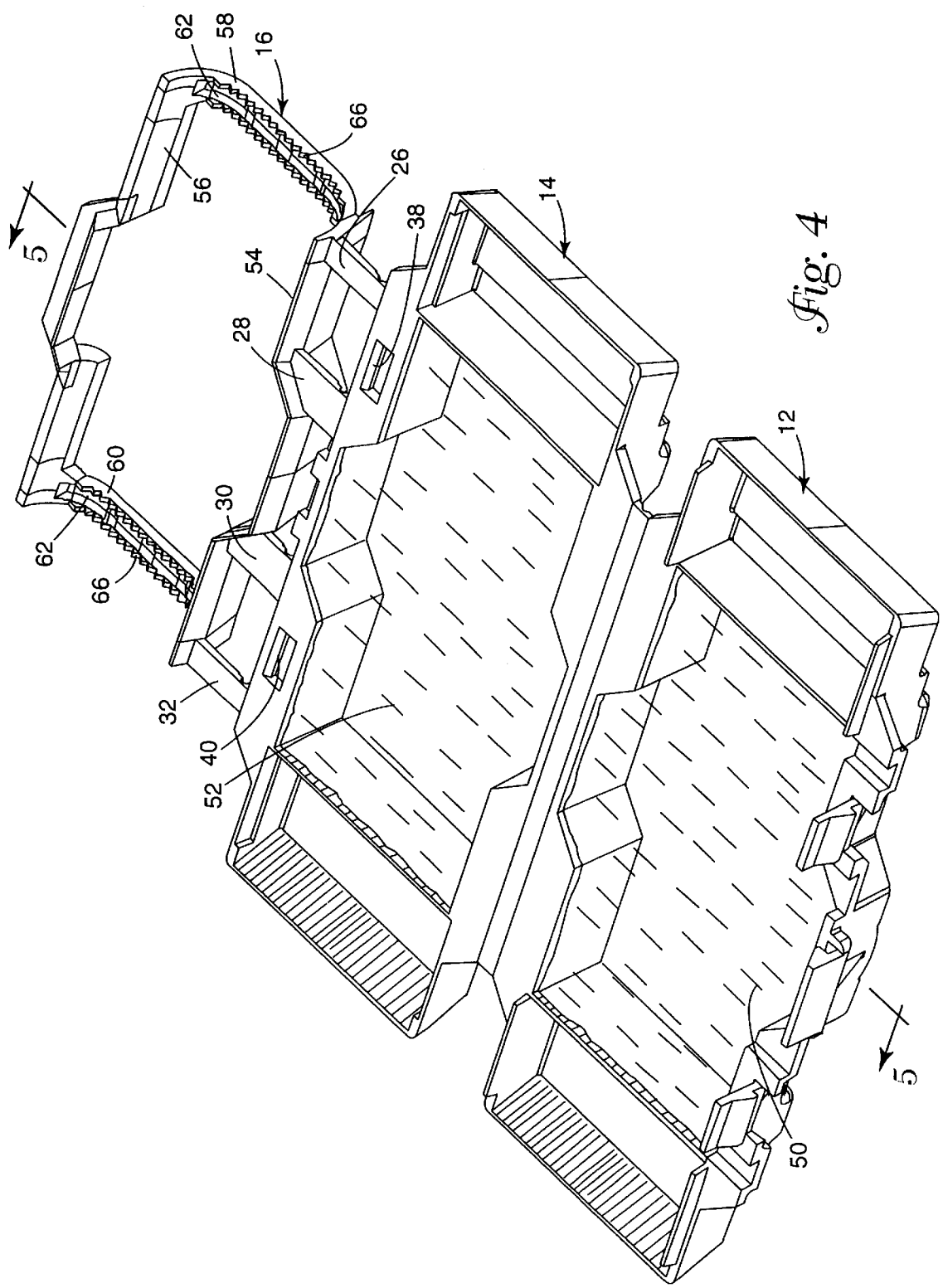
FIG. 4 corresponds to FIG. 3, with optionally used components removed from the fixation member of enclosure.

The configuration of the enclosure 10 as shown in FIG. 3 is nearly ready for use. To use the enclosure of FIG. 3, it is first necessary to remove the flat plate 22 from the fixation member 16, resulting in an enclosure as shown in FIG. 4. After removing the flat plate 22, the fixation member 16 consists of two longitudinal side bars 54, 56 which are connected by lateral bars 58 and 60. The longitudinal bar 54 is connected to hinges 26, 28, 30 and 32. The longitudinal bars 54, 56 are designed in a manner such that when folding the fixation member 16 into the second cover member 14, the bars 54, 56 penetrate into the sealant 52 and form a barrier which prevents the sealant 52 from leaking out the longitudinal sides of the enclosure 10. The lateral bars 58, 60 are each provided with several openings or slots 62. In the example shown, each bar 58, 60 contains 4 rectangular openings 62. In addition, the lateral bars 58, 60 are provided with teeth 66 to allow better gripping of the spliced cables (not shown).

Figure 6:
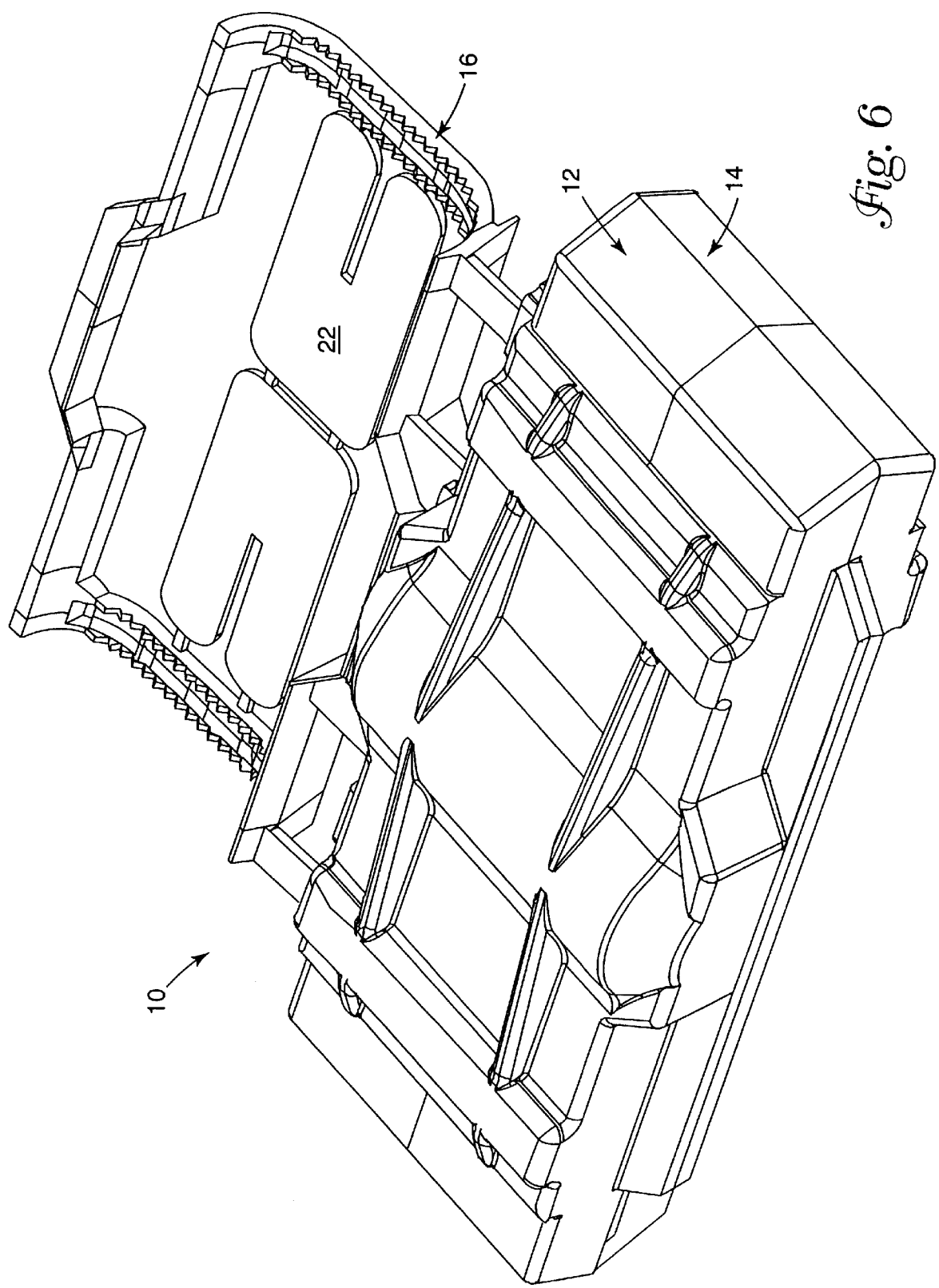
FIG. 6 is a perspective view of the enclosure of FIG. 5c.

FIGS. 5a, 5b and 5c illustrate a manner in which the enclosure 10 can be prepared for shipment and assembly. FIG. 5a corresponds to the cross-sectional view of the enclosure 10 as viewed along line 5—5 in FIG. 4. FIG. 5b illustrates first cover member 12 bent about hinge 24, with an optional release liner 70 placed over the sealant 52 in the second cover member 14. The release liner 70 preferably consists of a siliconized paper or polyethylene foil, Teflon foil, plastic sheet of polyester, or a similarly suited material which will not readily adhere to the sealants 50, 52. The first cover member 12 is further rotated on hinge 24 until tabs 34, 36 engage and latch into holes 38, 40. This configuration of the enclosure is particularly suitable for shipment of the enclosure 10 prior to assembly of the splice. In this manner, the sealant materials 50, 52 are well protected in the enclosure 10, while the connection of the cable splice onto the fixation member 16 can be completed independently from and without damage to the sealant material 50, 52. A perspective view of the configuration of FIG. 5c is shown in FIG. 6.

Figure 7:
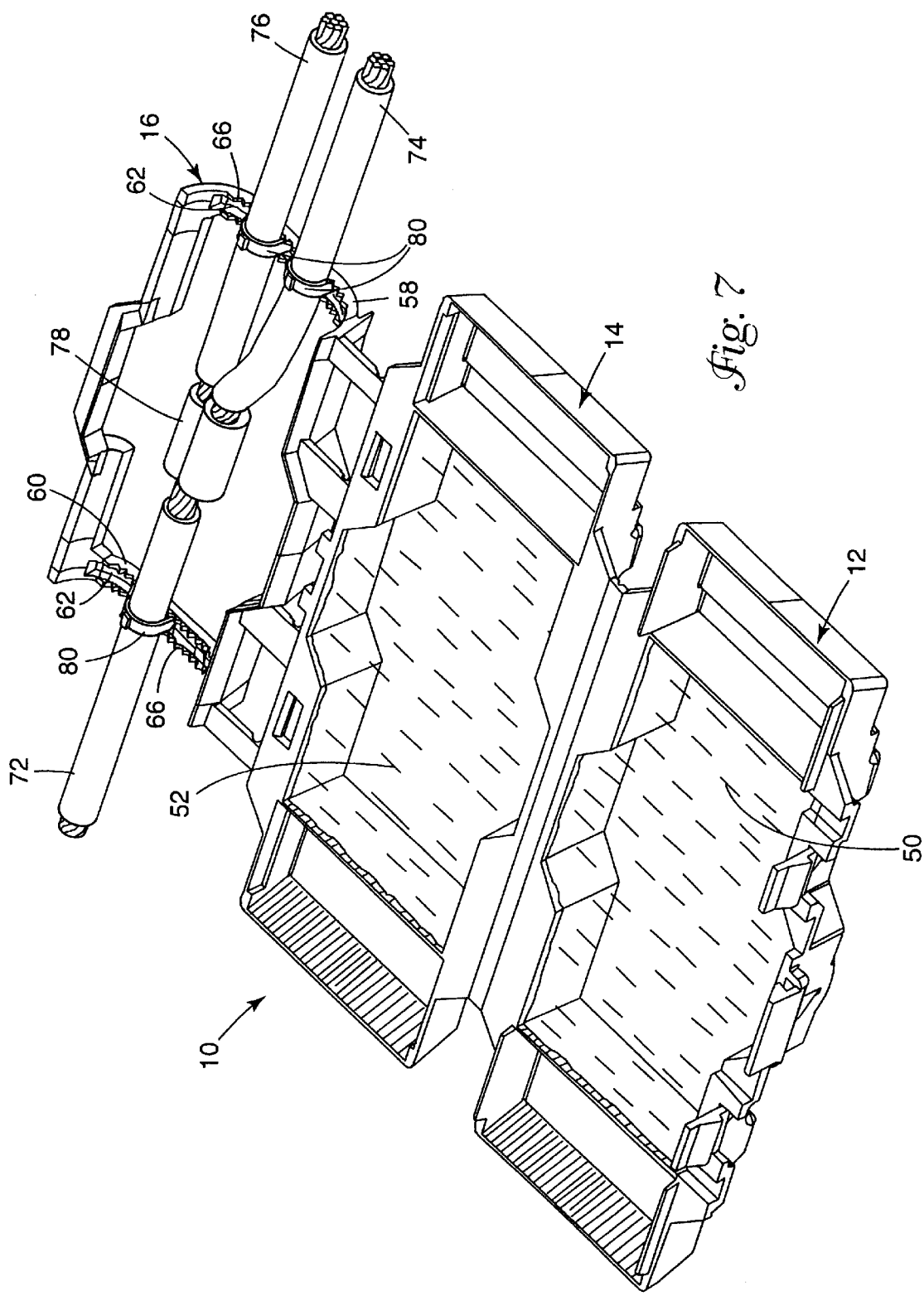
FIG. 7 is a perspective view showing the fixation of a first configuration of a cable splice onto the fixation member of the enclosure.

To use the enclosure 10, the splice cables are attached to fixation member 16, as shown in FIG. 7. Although FIG. 7 shows cover members 12, 14 in a separated or unlatched configuration, the cover members 12, 14 can also be left in a latched or closed position during the process of assembling the cable splice to fixation member 16. In the example shown in FIG. 7, a cable splice consists of a single cable 72 on one side and two cables 74, 76 on the opposite side which are connected to each other through a crimp connector 78. Of course, the connector can be of any type well known in the art, such as a screw connector. The cables 72, 74, 76 are fixed onto the bars 58, 60 which, as described above, are provided with openings 62, as well as teeth 66. The cables 72, 74, 76 are connected to bars 58, 60 using cable ties 80 which pass through two of the openings 62 in each of the bars 58, 60.

Figure 8A:
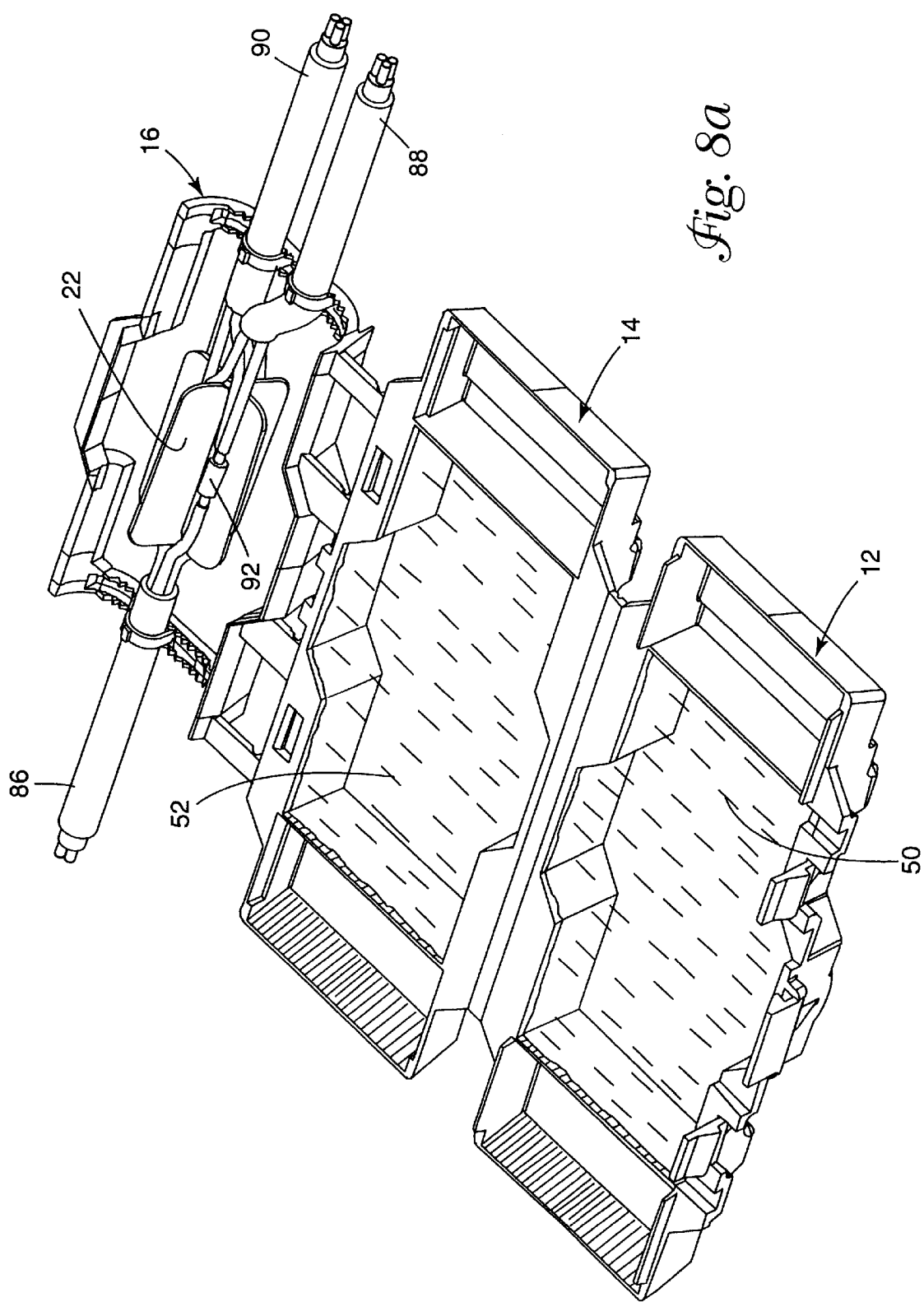
FIG. 8a is a perspective view showing the fixation of a second configuration of a cable splice onto the fixation member of the enclosure.

FIGS. 8a and 8b correspond to FIG. 7. FIG. 8a shows a slightly different configuration of cable splice fixed onto the fixation member 16. In FIG. 8a, the cables 86, 88 and 90 each comprise three individual wires. For each of the wires a connection is established using a connector 92. Each of the wires of the cables 86, 88 and 90 are similarly connected. The previously removed flat plates 22 are inserted between the spliced cable wires to form a solid insulative barrier between the wires. In the example of FIG. 8a, the provision of a solid insulating barrier between the individual spliced wires is important when connectors 92 are not insulated connectors, as the sealant 50,52 alone may not provide a sufficient insulating distance between the wires. FIG. 8b more clearly shows how the previously removed flat plates 22 are interlocked to form the separation means for the individual wire connections of the cables 86, 88 and 90. In this manner, inadvertent short circuits may be prevented between the spliced wires of the cables 86, 88 and 90. The advantage of this approach is that no additional components are necessary, as the flat plate 22 simultaneously serves as a runner during the molding process and as a separation means when necessary.

In addition to the examples shown in FIGS. 7 and 8a, other configurations of cable connections can be thought of, with the restriction of the number of cables essentially limited only by the size of the enclosure 10. Further, it is possible to house, for example, two completely separate splices in one enclosure provided that the connections would fit into the enclosure due to their geometry.

Figure 9A:
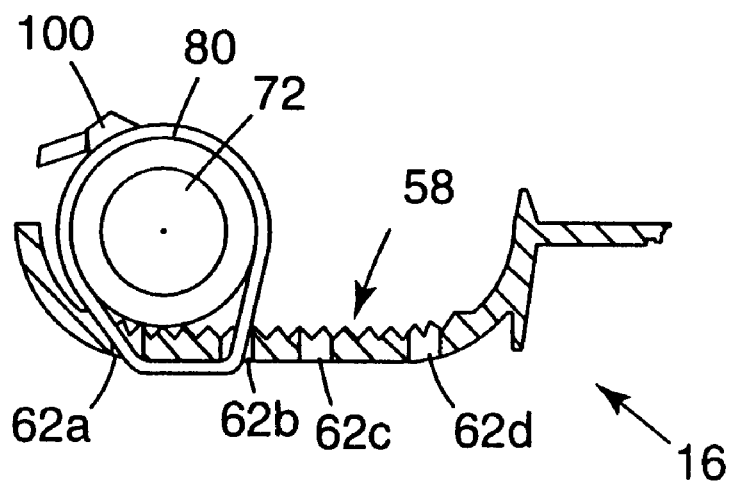
FIG. 9a and 9b are cross-sectional views of the fixation member illustrating two different methods for fixing a cable to the fixation member of the enclosure.
Figure 9B:
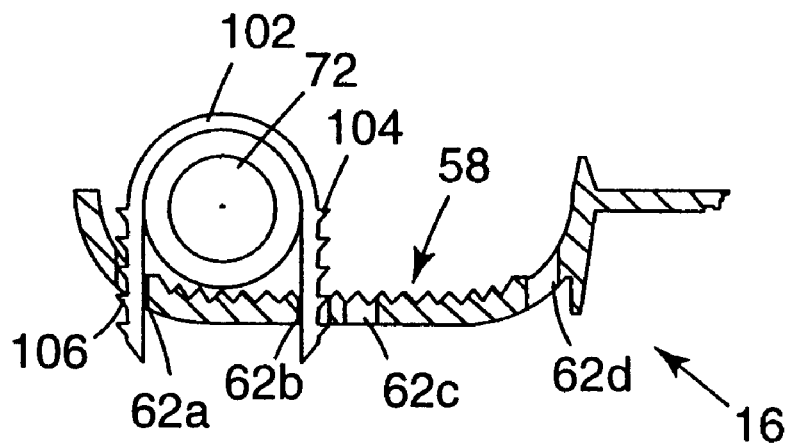

FIGS. 9a and 9b illustrate more closely the manner in which the cables are attached to the fixation member 16 and specifically to the bars 58, 60 of fixation member 16. In FIG. 9A, it can be seen that bar 58 is provided with four rectangular openings 62a, 62b, 62c and 62d. The cable tie 80 passes through two of the openings 62a and 62b and affixes cable 72 using a well-known latching means 100. It will be readily recognized that any suitable cable tie could be used. Preferably, the cable ties are selected of a suitable material to ensure proper fit in openings 62a–62d.

FIG. 9b shows an alternate manner of securing cable 72 to bar 58. In FIG. 9b, cable 72 is fixed onto bar 58 using a clamp 102 which is provided with multiple teeth 104, 106. The teeth 104, 106 of clamp 102 are pushed into the openings 62a and 62b as far as necessary until teeth 104, 106 engage the walls of holes 62a and 62b and provide the necessary holding force. In addition to the cable ties 80 and clamp 102 shown in the Figures, it will be recognized that other methods may be used to secure the cables to fixation member 16. For example, the cables may be secured by the use of wires, strings, threaded fasteners (such as screws), or any other suitable method.

FIGS. 10a through 10g show the completion of the assembly procedure after having fixed the cables onto the fixation member 16. FIG. 10 shows a splice configuration corresponding to those of FIGS. 7 and 8 with the cover members 12 and 14 in a closed position. As described above, the advantage of this configuration is that during the fixation of the cables to the fixation member 16, the sealants 50, 52 are well protected. After fixing the cables onto fixation member 16, the enclosure is opened by releasing the tabs 34, 36 and rotating first cover member 12 away from second cover member 14 about hinge 24 (FIG. 10b). At this time, any release liner 70 which has been inserted to keep sealants 50, 52 from adhering to each other may be removed. FIG. 10c shows the subsequent step where the cover members 12, 14 are completely opened. FIGS. 10d and 10e show the rotation of the fixation member 16 about hinges 26, 28, 30 and 32. Fixation member 16 is rotated until the cables 74, 76 penetrate into sealant 52. At this point, the sealant 52 is displaced by cables 74, 76 and may also penetrate onto the longitudinal sides 17 of the enclosure 10. In this case, the longitudinal bars 54, 56 of fixation member 16 ensure that the sealant can not move over the longitudinal sides 17, but rather are pushed in a direction around cables 74, 76.

After cables 74, 76 are embedded in sealant 52, cover member 12 is closed about fixation member 16 and cables 72, 74 until latches 34, 36 engage openings 38 and 40 of cover number 14. Cables 74 and 76 are then completely sealed by sealants 50, 52.

Figure 11:
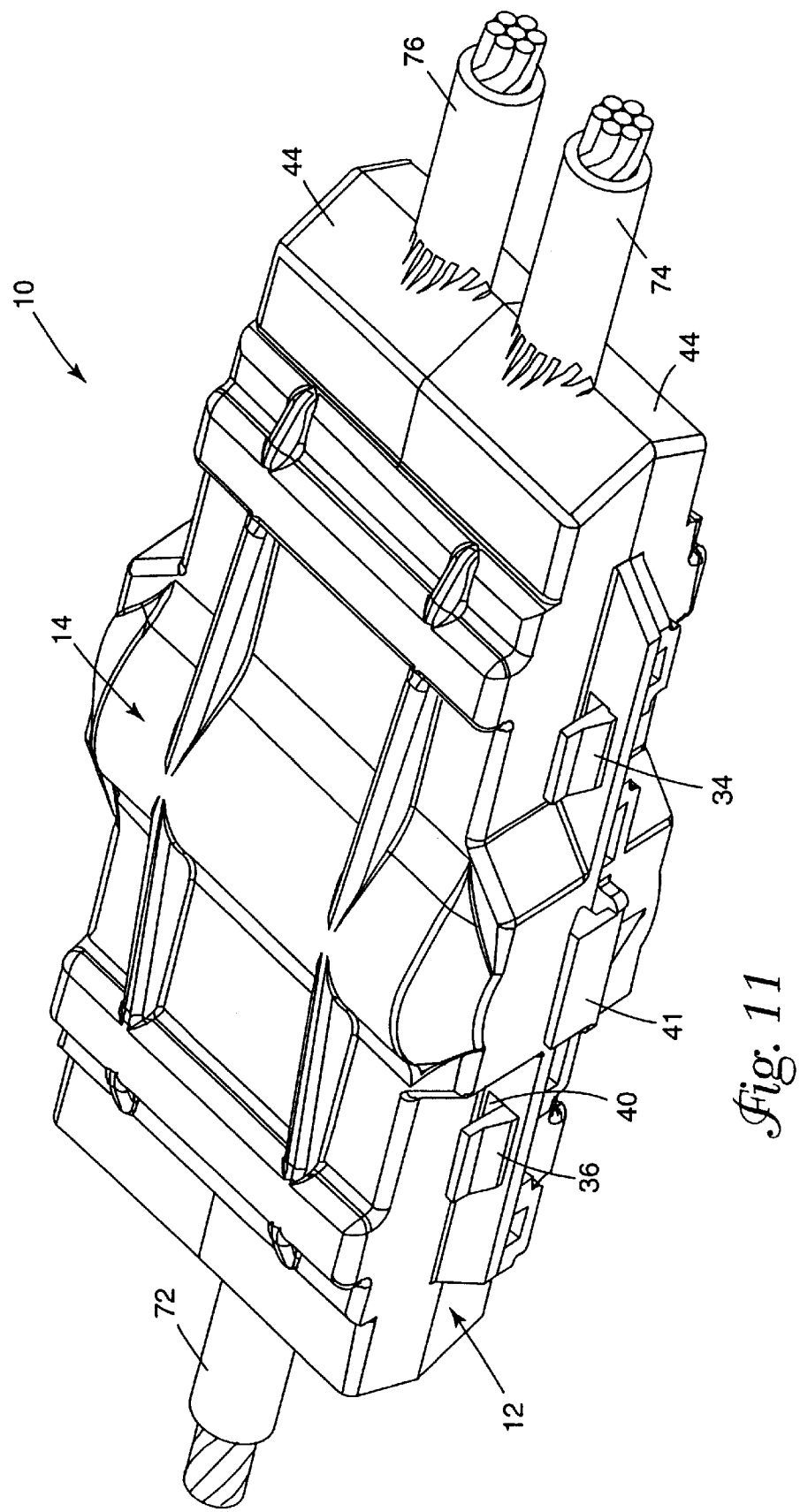
FIG. 11 is a perspective view of the completed assembly of a cable splice protected by the inventive enclosure described herein.

FIG. 11 shows a perspective view of the configuration after the assembly is completed. It shows the end walls 44 of cover members 12, 14 fractured along grooves 45 to allow the cables 74, 76 to exit the enclosure 10. A similar fracturing of intermediate walls 42 also occurs within the enclosure. Any sealant which escapes past intermediate walls 42 is trapped in reservoir 46 and is prevented from exiting the enclosure 10.

What is claimed is:

1. An enclosure for a cable splice formed by at least one connector splicing together at least two cables, the enclosure comprising:

a first cover member and a second cover member, each cover member having two longitudinal sides and two end walls, the first and second cover members configured to engage each other and form a cavity for enclosing the cable splice such that the cables project from at least one of the end walls of the cover members, wherein the cavity is filled with a sealant material for electrically insulating the cable splice and protecting the cable splice from the environment;

a cable fixation member for attachment to the cable splice, the fixation member configured such that the fixation member and the attached cable splice are inserted into the cavity formed by the first and second cover members, wherein the fixation member includes laterally extending bars which are positioned adjacent the end walls of the first and second cover members when the fixation member is inserted into the cavity, and wherein the laterally extending bars of the fixation member are provided with openings for receiving cable ties, and wherein the cables of the cable splice are attached to the fixation member with cable ties.

2. The enclosure of claim 1 wherein the cables of the cable splice are attached to the laterally extending bars of the fixation member by at least one clamp.

3. The enclosure of claim 1, wherein the first and second cover members are joined on corresponding longitudinal sides by a first hinge.

4. The enclosure of claim 3, wherein the fixation member is joined to the second cover member by a second hinge.

5. The enclosure of claim 4, wherein the first and second cover members and the fixation member are formed by a molding process, and wherein the hinges are integrally molded with the first and second cover members and the fixation member.

6. The enclosure of claim 5, wherein the first and the second members can be releasably engaged to each other, thereby leaving the fixation member outside the enclosure.

7. The enclosure of claim 6, wherein a release liner is placed against a surface of the sealant in the cavity.

8. The enclosure of claim 1, wherein the first and second cover members are adapted to releasably engage each other.

9. The enclosure of claim 8, wherein at least one of the first and second cover members include resilient latching mechanisms for engaging receiving holes in the other of the cover members.

10. The enclosure of claim 1, wherein the interior of the cavity is provided with ridges to create better adhesion between the sealant and the cover members.

11. The enclosure of claim 1, wherein the end walls of the first and second cover members are adapted to fracture or bend away when pressed against the cables which project from the enclosure.

12. The enclosure of claim 11, wherein the end walls have a plurality of grooves, the grooves adapted to fracture when pressed against the cables which project from the enclosure.

13. An enclosure for a cable splice formed by at least one connector splicing together at least two cables, the enclosure comprising:

a first cover member and a second cover member, each cover member having two longitudinal sides and two end walls, the first and second cover members configured to engage each other and form a cavity for enclosing the cable splice such that the cables project from at least one of the end walls of the cover members, wherein the cavity is filled with a sealant material for electrically insulating the cable splice and protecting the cable splice from the environment;

a cable fixation member for attachment to the cable splice, the fixation member configured such that the fixation member and the attached cable splice are inserted into the cavity formed by the first and second cover members, wherein the fixation member includes laterally extending bars which are positioned adjacent the end walls of the first and second cover members when the fixation member is inserted into the cavity, and wherein the laterally extending bars of the fixation member further comprise teeth for gripping the cables.

14. An enclosure for a cable splice formed by at least one connector splicing together at least two cables, the enclosure comprising:

a first cover member and a second cover member, each cover member having two longitudinal sides and two end walls, the first and second cover members configured to engage each other and form a cavity for enclosing the cable splice such that the cables project from at least one of the end walls of the cover members, wherein the cavity is filled with a sealant material for electrically insulating the cable splice and protecting the cable splice from the environment; and a cable fixation member for attachment to the cable splice, the fixation member configured such that the fixation member and the attached cable splice are inserted into the cavity formed by the first and second cover members, wherein the fixation member includes at least one longitudinal bar adapted to be positioned adjacent a longitudinal side of at least one of the first or second cover members, such that upon insertion of the fixation member into the cavity the sealant is directed around the cable splice.

15. An enclosure for a cable splice according to claim 14, wherein the at least one longitudinal bar includes two longitudinal bars, the longitudinal bars adapted to be positioned along opposite longitudinal sides of the first and second cover members when the fixation member is inserted in the cavity.

16. An enclosure for a cable splice formed by at least one connector splicing together at least two cables, the enclosure comprising:

a first cover member and a second cover member, each cover member having two longitudinal sides and two end walls, the first and second cover members configured to engage each other and form a cavity for enclosing the cable splice such that the cables project from at least one of the end walls of the cover members, wherein the cavity is filled with a sealant material for electrically insulating the cable splice and protecting the cable splice from the environment;

a cable fixation member for attachment to the cable splice, the fixation member configured such that the fixation member and an attached cable splice are inserted into the cavity formed by the first and second cover members, wherein the first and second cover members, when engaged, further include a reservoir between the sealant filled cavity and the mated end walls of the cover members, the reservoir adapted to capture sealant which leaks out of the cavity and thereby prevent the sealant from escaping from the enclosure, and wherein the reservoir is formed by intermediate walls spaced from the end walls of the cover members, the intermediate walls and the end walls adapted to fracture or bend away when pressed against the cables which project from the enclosure.

* * * * *